Oct. 6, 1953      S. E. PROCTOR      2,654,410
LOCKING DEVICE FOR TOOLHOLDING OR LIKE SET-SCREWS
Filed July 14, 1947
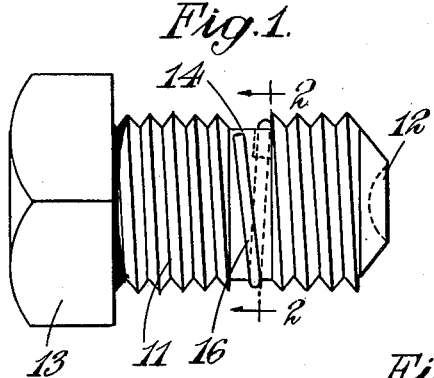
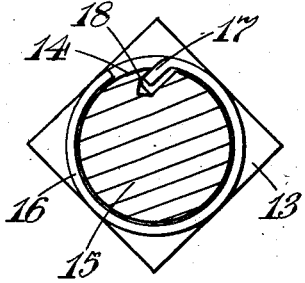
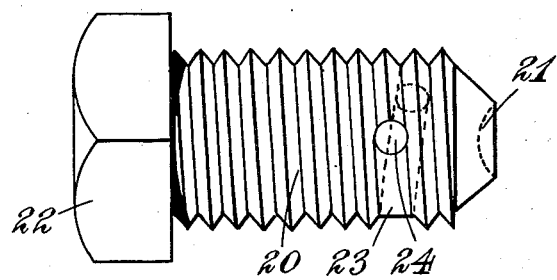
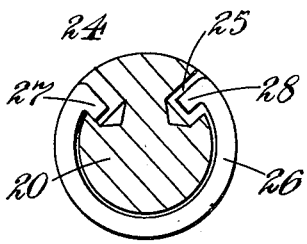
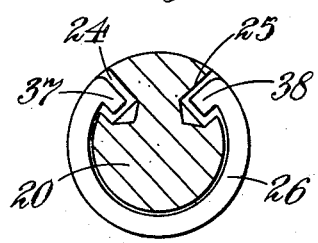
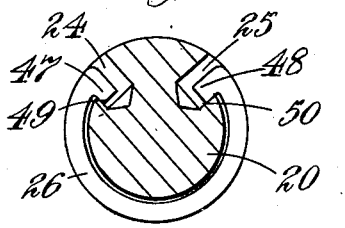
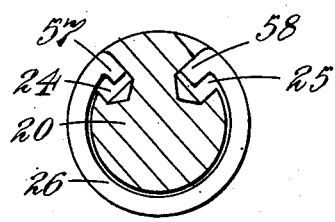
INVENTOR
S. E. Proctor
By Watson, Cole, Grindle & Watson Patented Oct. 6, 1953

2,654,410

UNITED STATES PATENT OFFICE 2,654,410

LOCKING DEVICE FOR TOOLHOLDING OR LIKE SET-SCREWS

Sidney Ernest Proctor, Aylesbury, England, assignor to Austin Hoy & Company Limited, Aylesbury, England, a British company Application July 14, 1947, Serial No. 760,769
In Great Britain February 9, 1944

Section 1, Public Law 690, August 8, 1946
Patent expires February 9, 1964

4 Claims. (Cl. 151—25)

This invention comprises improvements in or relating to locking devices for tool-holding or like set-screws.

It is an object of this invention to provide means for locking set-screws of the type used, for example, for locking tools in tool boxes, in which the end of the screw exerts clamping pressure and the head of the screw is therefore not screwed up against a shoulder. In such cases the ordinary locking means for engaging the screw-head are not applicable.

The invention is particularly applicable to set-screws for the tool boxes of coal-cutter chains, which are liable to become loose by vibration. These require a locking device which does not involve any modification of the tool box and which is shielded as far as possible from water and grit.

The present invention comprises a set-screw locking device wherein the set-screw has a portion of the screw thread cut away and there is fitted in its place a turn or part-turn of wire, one end at least of which is secured to the screw and which is so disposed as to encircle the screw, the wire being such as to fit into a groove of the thread into which the set-screw is screwed when in use and to engage the same firmly.

The wire may be secured to the set-screw at its leading end. If so secured, the screw may be easily screwed up but reverse rotation to unscrew the set-screw is strongly resisted because the tendency of such reverse rotation is to enlarge the diameter of the turn of the wire. If a single turn of wire only is used, the result is tight enough to prevent loosening under vibration but not to resist a spanner. The wire may be a little less or more than a complete turn and the end which is entered into the fixing hole is preferably not radial; the hole should be drilled at an angle to the radius which, at the surface, is about 45°, so as to reduce the sharpness of the bend in the wire.

While the locking device constructed with the leading end of the turn of wire secured to the set-screw is excellent for screws which are not likely to be frequently unscrewed, it is sometimes desirable to provide a locking device which can be repeatedly unscrewed without loss of efficiency. To this end, both ends of the wire may be provided with means to attach them to the set-screw and it is found that if this is done, the frictional load reduced by the turn of wire on the surrounding thread of the hole into which the set-screw is screwed, is prevented from becoming sufficient to damage the parts when unscrewing takes place.

The means of securing the wire to the set-screw may comprise an end or ends which are inturned and enter the hole or holes drilled in the set-screw.

The following is a description, by way of example, of certain constructions in accordance with the invention, reference being made to the accompanying drawing, in which:

Figure 1 is a side elevation of a set-screw,

Figure 2 is a cross section upon the line 2—2 of Figure 1 looking in the direction of the arrows, Figure 3 is a side elevation of an alternative form with the wire ring removed, Figure 4 is a cross section through the screw of Figure 3 with a wire ring of particular proportions located therein, Figure 5 is a similar cross section to Figure 4 with a wire ring of different proportions, Figure 6 is a similar cross section of another modification, and Figure 7 is a similar cross section of yet another modification.

Referring to Figure 1, this shows a set-screw 11 which is made of hardened steel with a hollow conical point 12 and a square head 13 such as is employed for fixing tools in tool boxes for coal cutter chains and in like positions. About the mid-length of the thread of the set-screw there is a groove 14 where the thread has been cut away down to the diameter of the core 15. In the groove 14 there is located a part-turn of wire 16, the leading end of which is somewhat inturned, as shown at 17, and enters a hole 18 drilled in the core at an angle of about 45° to the radial direction. In screwing the set-screw into a threaded hole in a tool box or other device in which it is to be used, the wire 16 will fit into the groove of the surrounding thread of the tool box or like, and being somewhat springy, will engage the thread firmly and prevent any looseness of the set-screw 11 even if, as is usual, the thread is made a somewhat slack fit. The leading end of the wire 16, being secured to the core of the set-screw by the inturned portion 17, will be drawn forward as the screw advances and entering of the screw in the hole is easy. Upon any tendency, due to vibration or otherwise, of the screw 11 to become unscrewed, the wire ring 16 resists the movement and keeps the set-screw up to its work. If a spanner is applied to the head, sufficient force can be brought to bear to draw the screw out, but nevertheless, owing to the tendency of the wire ring 16 to expand when being pushed round in the hole from the inturned end 17, such removal is strongly resisted and may even in some cases cause damage to the thread. This construction is therefore principally adapted for cases in which the set-screw, once tightened, is not liable to be required to be frequently undone.

Referring to Figure 3, this shows a set-screw 20 having a hollow conical point 21 and a head 22, the general construction being similar to that of the set-screw 11 of Figure 1. Ordinarily, such a set-screw will be made of hardened steel, as already described. The groove 23 is cut around part of the set-screw near the tip, this groove extending for about three quarters of a turn and being terminated at each end by a hole such as holes 24, 25, Figure 4. In the cut away portion there is inserted a wire which is not shown in Figure 3, but is marked as 26 Figure 4. The ends of the wire ring 26 are inturned, as shown at 27, 28, so that they enter the holes 24, 25 and the diameter of the ring 26 is such that, when the set-screw is screwed into a screw-threaded hole, the ring 26 will be slightly compressed, in order to fit the thread.

As shown in Figure 4, the holes 24, 25 are of larger diameter than the inturned ends of the wire and the proportions are such that, when the screw is being unscrewed, the end 27 of the wire will abut with its inner face on the edge of the hole 24 and thus the ring 26 will be drawn out of the hole by exerting tension on its leading edge. Similarly, when the screw is being screwed up, the inner face of the inturned portion 23 will engage the lip of the hole 25 and tension will be exerted on the ring 26. Thus, whether being screwed up or unscrewed, the ring 26 will be slightly contracted by the tension exerted upon its leading edge and about an equal amount of friction will oppose movement under a spanner in either direction.

If the wire ring 26 is made flat, that is to say so that the whole of the wire 26 is in one plane, one effect is that the ring sets itself so that the mid-portion extends parallel to the helix of the thread and the end portions are then necessarily not quite parallel to the helix. The result is that the end portions bear on the sides of the helix of the female thread into which the set-screw is screwed and a certain amount of binding effect is obtained from this pressure on the sides of the thread in addition to the pressure due to compression of the wire ring 26.

Figure 5 shows a modification in which the inturned ends 37, 38, lie centrally within the holes 24, 25 when the wire ring 26 is in place and the screw is screwed into a nut. The result is that, when the screw is being screwed up, the inner edge of the inturned portion 38 will engage the lip of the hole 25 at the same time that the outside of the turned-in portion 37 engages the back of the hole 24 and the wire ring 26 is pulled from in front and pushed from behind with an equal force. The same applies to the opposite direction of rotation.

It will be noted that with both the construction of Figure 4 and that of Figure 5, there is a slight backlash between the screw 20 and the ring 26 before the space is taken up which exists between the inturned ends of the wire and the sides of the holes 24, 25 in which these lie.

Backlash is eliminated in the construction of Figure 7. The general arrangement is similar to that already described, but in Figure 6 the wire ring 26 is short enough to ensure that the inturned ends 47, 48 both engage the nearest shoulder 49, 50 of the holes 24, 25. Thus the ring 26 will be slightly contracted by being pulled at its leading edge for both directions of rotation of the set-screw 20.

In Figure 7, the reverse is the case, the outer faces of the inturned portions 57, 58 bear against the far walls of the holes 24, 25 and thus the ring 26 is pushed, and therefore expanded, for both directions of rotation of the set-screw 20. In this case, maximum resistance to rotation in both directions is secured, a condition which, in certain instances, may be advisable.

I claim:

1. In combination, an externally threaded set-screw having a helical thread adapted to fit and cooperate with an internal screw thread and having a forward end and having its thread interrupted for a portion of one convolution thereof at a point adjacent, but spaced from said forward end, the interruption of said thread resulting in the presence of a helically extending groove and said set-screw having at the opposite ends of said groove radially inwardly extending recesses, and a part-turn of wire received in said groove and having radially inturned ends, and of a free curvature requiring compression for the same to be received in the groove of the internal screw thread, said inturned ends received in said recesses and smaller than the latter and having the distance between them, measured along the length of said wire, greater than the distance between the adjacent sides of the mouths of said recesses measured along the bottom of said groove, and having the distance between their outer sides, measured along the length of said wire, less than the distance between the more remote sides of the mouths of said recesses measured along the bottom of said groove, whereby relative shifting between said set-screw and said wire may take place upon rotation of said set-screw in either direction, the rearward side of the recess which is ahead during any particular rotation of the screw engaging the rearward side of the inturned end at the then forward end of said wire, and pulling said wire along the internal screw thread in frictional contact with the latter.

2. A set-screw for reception in an internally threaded socket and screwable into or out of such a socket upon the application of an appropriate rotative force, but held against unscrewing by the vibration to which it may be subjected in normal use, said set-screw having a helical thread formed thereon of which a portion of one turn is cut away to provide a helically disposed groove and said set-screw having holes extending inwardly from the bottom of said groove at circumferentially separated points, and an arcuate spring conforming when free to a circular arc and having an inturned end at each of its ends and of a length measured along the arc thereof such that said ends are receivable in said holes with clearance at both ends simultaneously, said clearance so distributed that when the screw is rotated in either direction in its threaded socket the then rearward side of the then forward opening, in terms of screw rotation, will engage and exert traction upon the inturned end which extends into it, said spring of such cross section and formed on such an arc, of greater radius than the radius of the bottom of said groove, that when confined in the space between the bottom of said groove and the sides of the threads of the socket which are at the opposite sides of said groove, and not under longitudinal traction, it contacts, while out of contact with the bottom of said groove, at least for an extended distance adjacent its arcuate center, said adjacent threads under its own elasticity.

3. A set-screw for reception in an internally threaded socket and screwable into or out of such a socket upon the application of an appropriate rotative force, but held against unscrewing by the vibration to which it may be subjected in normal use, said set-screw having a helical thread formed thereon of which a portion of one turn is cut away to provide a helically disposed groove and said set-screw having holes extending inwardly from the bottom of said groove at circumferentially separated points, and an arcuate spring conforming when free to a circular arc and having an inturned end at each of its ends and of a length measured along the arc thereof such that said ends are receivable in said holes with clearance at both ends simultaneously, said clearance so distributed that when the screw is rotated in either direction in its threaded socket the then rearward side of the then forward opening, in terms of screw rotation, will engage and exert traction upon the inturned end which extends into it, the cross section of said spring, the arc of said spring when unconfined and the length of said spring between its ends being such that, when said spring is confined in the space between the bottom of the groove and the sides of the socket threads which are opposite said groove, and not under longitudinal traction, the reaction of the spring ends on the socket threads effects a pressing of the mid-portion of the spring against the socket threads and a separation of such portion from contact with the bottom of the groove.

4. A set-screw for reception in an internally threaded socket and screwable into or out of such a socket upon the application of an appropriate rotative force, but held against unscrewing by the vibration to which it may be subjected in normal use, said set-screw having a helical thread formed thereon of which a portion of one turn is cut away to provide a helically disposed groove and said set-screw having holes extending inwardly from the bottom of said groove at circumferentially separated points, and an arcuate spring having an inturned end at each of its ends and of a length measured along the arc thereof such that said ends are receivable in said holes with clearance at both ends simultaneously, said clearance so distributed that when the screw is rotated in either direction in its threaded socket the then rearward side of the then forward opening, in terms of screw rotation, will engage and exert traction upon the inturned end which extends into it, said spring when unconfined, conforming to the arc of a circle and adapted to lie flat upon a plane surface, and the cross section of said spring, the arc thereof when unconfined, and its length between its ends being such that when said spring is confined in the space between the bottom of the groove and the sides of the socket threads which are opposite said groove, and not under longitudinal traction transmitted to it through one of its inturned ends, a reaction of one spring end on one of said socket threads greater than on the other and a reaction of the other spring end on the other one of said socket threads greater than that on the first will be attended by an engagement of the mid portion of the spring with both of said socket threads under substantially equal pressure while the portion of the spring between its inturned ends is out of contact with the bottom of said groove.

SIDNEY ERNEST PROCTOR.

References Cited in the file of this patent

UNITED STATES PATENTS

| Number | Name | Date |
|---|---|---|
| 1,272,229 | Daly | July 9, 1918 |
| 1,502,555 | Eklund | July 22, 1924 |
| 1,816,591 | Kirby | July 28, 1931 |
| 2,233,889 | Hood | Mar. 4, 1941 |

FOREIGN PATENTS

| Number | Country | Date |
|---|---|---|
| 317,106 | Germany | Dec. 9, 1919 |
| 408,608 | Great Britain | Apr. 11, 1934 |